(Model.)

C. A. HAVILAND.
FISH HOOK.

No. 471,548. Patented Mar. 29, 1892.

Witnesses:
Robert H. Davison
Joseph A. Lynch

Inventor.
Charles A. Haviland

UNITED STATES PATENT OFFICE.

CHARLES A. HAVILAND, OF BROOKLYN, NEW YORK.

FISH-HOOK.

SPECIFICATION forming part of Letters Patent No. 471,548, dated March 29, 1892.

Application filed October 21, 1891. Serial No. 409,458. (Model.)

*To all whom it may concern:*

Be it known that I, CHARLES A. HAVILAND, of Brooklyn, in the county of Kings and State of New York, have invented a new and Improved Fish-Hook, which is fully explained in the following specification, reference being had to the accompanying drawings.

The objects of my invention are, first, to increase the chance or likelihood of hooking the fish as it attempts to take the bait; second, to provide a means of attaching the hook to and detaching it from the line, whereby the act will be greatly facilitated; third, to make or manufacture out of one piece of wire a fish-hook having two curved and barbed hooking-points without splitting the wire.

Figure 1:
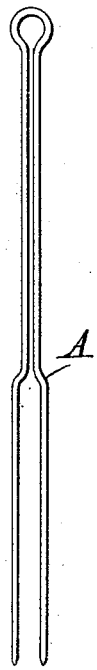
Figure 2:
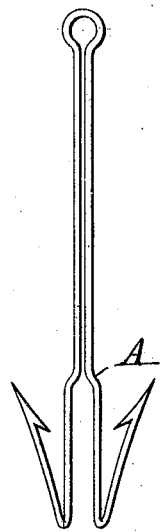

In the drawings, Figure 1 is a front elevation of a partly-formed hook, illustrating at $a$ the point at which the shanks diverge; and Fig. 2 a front elevation of finished hook.

A piece of steel wire of suitable length is folded in the middle in such a manner as to form a small loop or eye at the fold, and the two sides or wires thus brought together are continued parallel (and so close as to be nearly if not quite in contact) for a sufficient length or distance to form the shank of a hook. (See drawing, Fig. 1.) At the point where the shank would naturally end and the hook proper begin (see Fig. 1$^A$) the wires or sides are separated or divided somewhat and then again continue nearly parallel to the bottom or base of the round of the hook and then spread apart by a gradual outward curve to the points, which are barbed in the usual manner. (See drawing, Fig. 2.) The purpose of the bend which spreads the wires at the base of the shank (see drawing, Fig. 1$^A$) is to allow sufficient room for baiting the points without interfering the one with the other.

By forming a small loop at the end of the fish-line the hook can be attached by slipping the loop over one of the points and sliding it along until it reaches the eye at the top of the shank, and can be detached by reverse action.

This hook will hold nearly double the amount of bait that can be worked onto a single hook, and it is a well-known fact among experienced fishermen that to attract large fish the bait must be liberally spread on.

In fishing with the ordinary single hook, when the angler does get a bite he stands about one chance in ten of catching the fish, as the greasy substance used for bait aids the exit or withdrawal of the hook from the mouth without piercing the gills; but this double hook with spreading points must pierce the gills if the fish bites high enough to cover the points.

I am aware that prior to my invention double hooks have been made from one piece of wire (though of a spring-acting back-to-back pattern.) I therefore do not claim such a combination, broadly.

What I do claim as my invention, and desire to secure by Letters Patent, is—

A compound fish-hook formed of a single piece of wire bent upon itself and forming parallel contiguous shanks, shoulders thereon which diverge the shanks slightly near the hooks, and barbed terminals which are radially arranged with relation to each other.

CHARLES A. HAVILAND.

Witnesses:
ROBERT H. DAVISON,
JOSEPH A. LYNCH.